March 31, 1970 C. A. HEYNE 3,503,490
DESCENDING ACCUMULATING CONVEYOR
Filed Jan. 5, 1968 4 Sheets-Sheet 1

INVENTOR.
CLARENCE A. HEYNE
BY E. J. Holler &
W. A. Schaich
ATTORNEYS

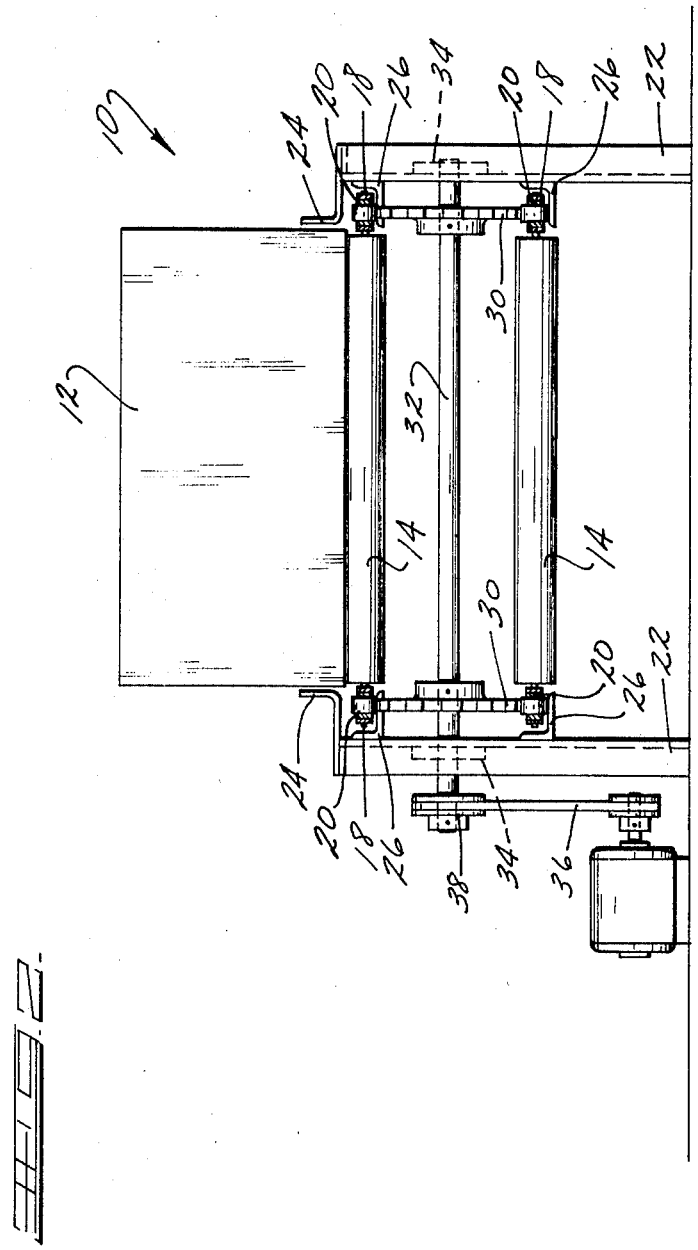

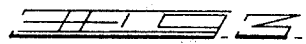
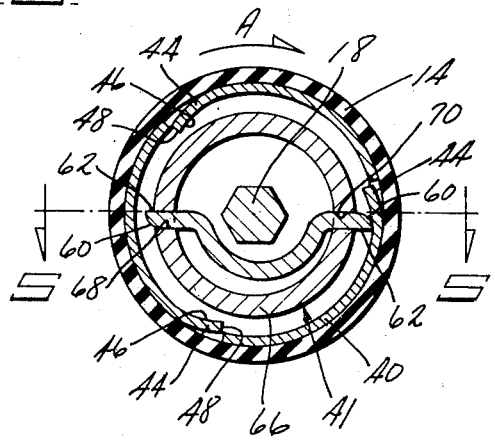
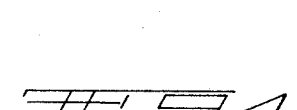
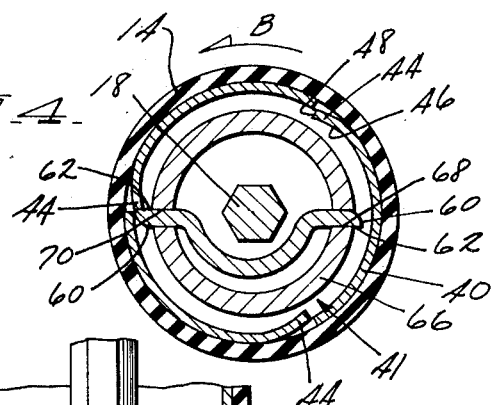
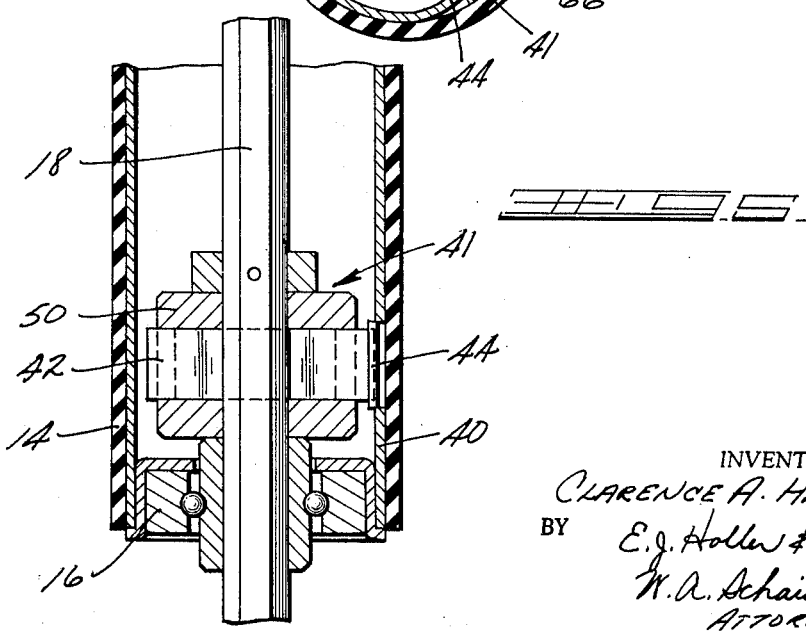
INVENTOR.
CLARENCE A. HEYNE
BY E.J. Holler &
W. A. Schaich
ATTORNEYS March 31, 1970  C. A. HEYNE  3,503,490
DESCENDING ACCUMULATING CONVEYOR
Filed Jan. 5, 1968  4 Sheets-Sheet 1
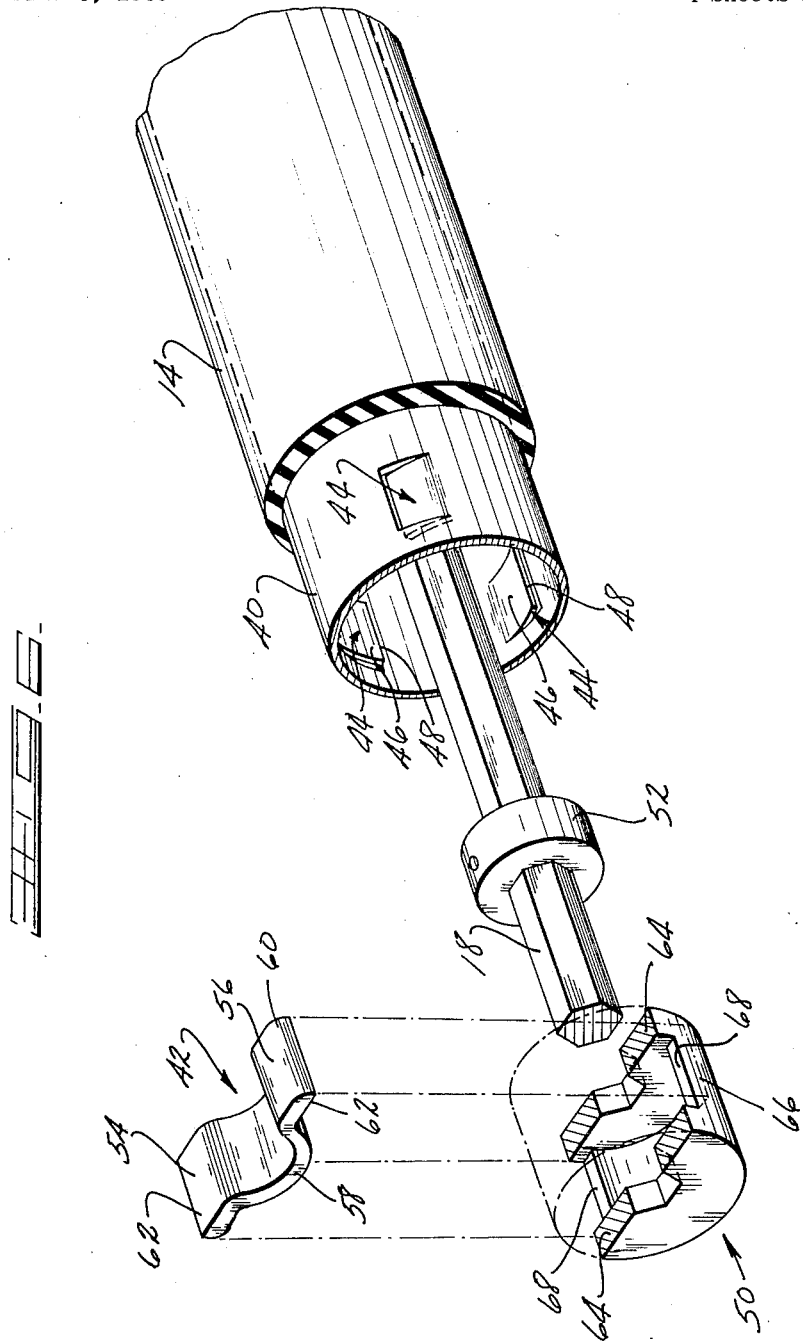
INVENTOR.
CLARENCE A. HEYNE
BY E. J. Holler &
W. A. Schaich
ATTORNEYS

United States Patent Office 3,503,490
Patented Mar. 31, 1970

3,503,490
DESCENDING ACCUMULATING CONVEYOR
Clarence A. Heyne, Toledo, Ohio, assignor to Owens-Illinois, Inc., a corporation of Ohio
Filed Jan. 5, 1968, Ser. No. 695,951
Int. Cl. B65g 15/00
U.S. Cl. 198—183                                     11 Claims

ABSTRACT OF THE DISCLOSURE

An inclined power-driven conveyor of the type having a plurality of rotatable, article-transporting rollers positioned about chain-driven axles disposed transversely of the conveyor, wherein a longitudinally-oscillatable pawl member and a ratchet member are enclosed within the respective roller for restraining downwardly-directed rotation of the load-bearing surfaces of said rollers, and for allowing upwardly-directed free rotation of such roller surfaces.

BACKGROUND OF THE INVENTION

This invention generally relates to article conveying devices; more particularly, it releates to power-driven roller conveyors which are adapted for article transportation and articles accumulation.

In practice, the use of level accumulating conveyors is quite extensive. These conveyors typically include a series of rotatable rollers which are continually translated in a level linear path by means of a chain driving element attached to the roller shafts. Cartons, which are supported by adjacent rollers, are transported along the conveyor as a result of the rollers' translational movement. Moreover, should some retaining force be applied to the transported cartons whereby these cartons would no longer be free to unitarily translate with their appurtenant supporting rollers, the chain, because of the rotatable nature of the rollers, can drag the rollers beneath the carton without any adverse cutting or scoring. Thus, a succession of cartons may be continually supplied to an accumulating zone by the translating rollers and being restrained in this zone the chain is free to slip beneath the accumulated cartons without marring their appearance.

Unfortunately, the foregoing type conveyors are only operable when the cartons are to be transported and accumulated in a horizontal plane. Considering the fact that in most manufacturing operations there is a substantial employment of descending conveyors, it would be desirable to provide for a descending conveyor which possesses carton accumulating features.

SUMMARY OF THE INVENTION

In accordance with this invention there is provided an inclined accumulating conveyor possessing features which allow controlled descent of cartons along the conveyor.

More particularly, in accordance with this invention, there is provided an inclined conveyor of the type having a plurality of translating rotatable rollers wherein unidirectional roller arresting means are enclosed within the roller, the arresting means being operative ot restrain downwardly-directed roller rotation but to allow upwardly-directed rotation. In the preferred embodiment, the unidirectional roller arresting means includes ratchet means carried by the respective rollers and pawl means adapted to interlock with said ratchet means in response to one mode of roller rotation, the pawl means undergoing a continuously slipping, longitudinal oscillation in response to the reverse mode of rotation.

BRIEF DESCRIPTION OF THE DRAWINGS

The foregoing and other advantages features of this invention will become more apparent by reference to the drawings of which:

FIG. 2 is a transverse elevational view of the conveyor of FIG. 1;

FIG. 3 is an enlarged vertical sectional view of an individual roller showing one operating mode of the roller arresting means of this invention;

FIG. 4 is a sectional view similar to FIG. 3 showing an alternate mode of operation;

FIG. 5 is a longitudinal sectional view of one roller taken along the line 5—5 of FIG. 3; and FIG. 6 is an exploded perspective view showing the pawl and ratchet members of one roller of this invention.

DESCRIPTION OF PREFERRED EMBODIMENT(S)

Figure 1:
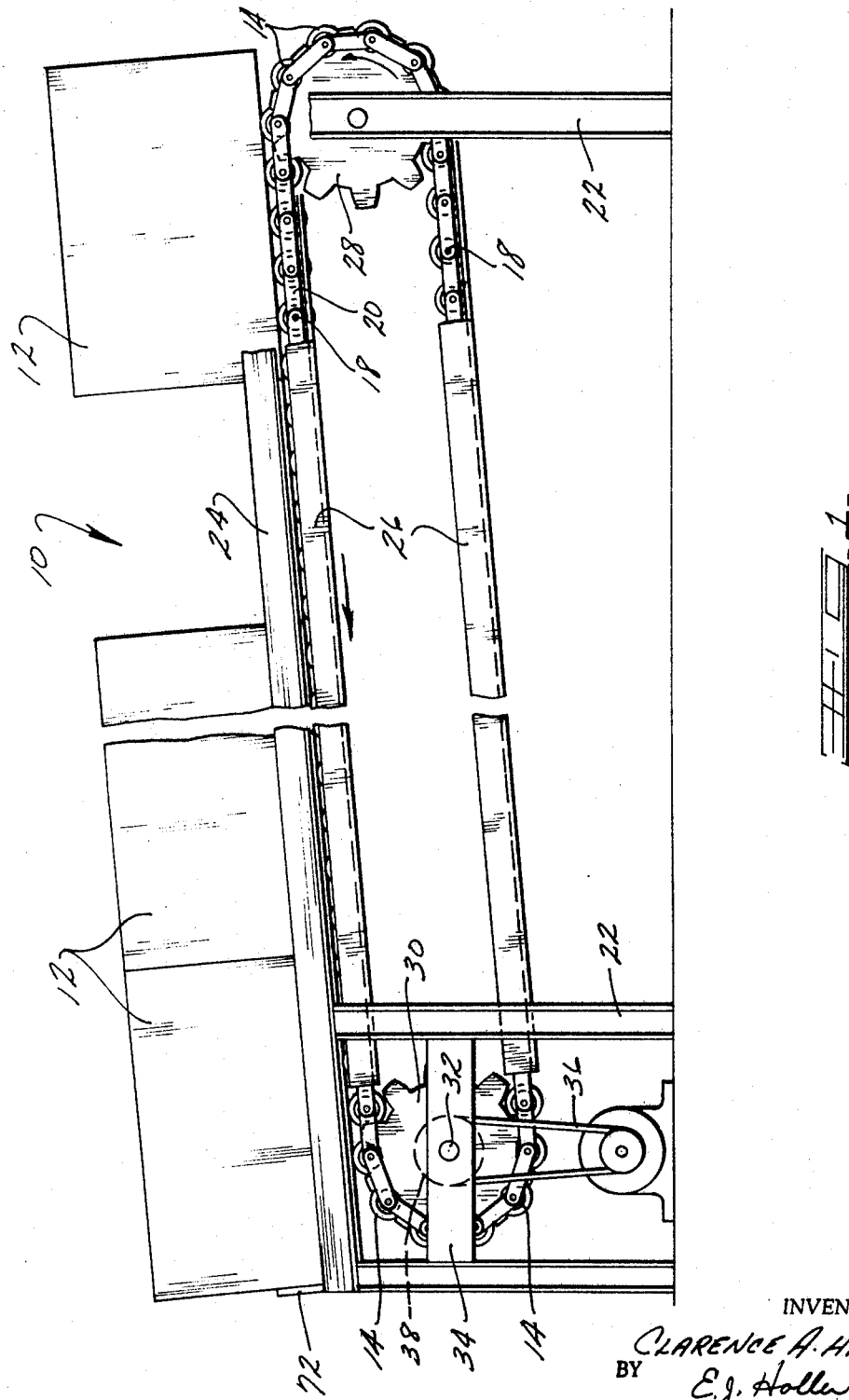
FIG. 1 is a longitudinal elevational view of a preferred form of conveyor of this invention.

Referring to FIGURES 1 and 2 there is shown a descending conveyor 10 for transporting and accumulating a series of cartons 12. Conveyor 10 includes a plurality of parallel carton-supporting rollers 14, each rotatably mounted by a bearing assembly (FIG. 5) disposed at each end of an individual shaft 18. In the preferred embodiment rollers 14 at least include an outer casing of a suitable material having a high coefficient of friction; such as rubber for example. The rollers thereby provide a frictional contact with the respective cartons and, as will be subsequently seen, prevent uncontrolled carton descent along conveyor 10. The respective shafts 18 are affixed at each end to an inclined, continuous chain belt 20 and are movable in unison therewith. Thus, a pair of similar chain belts 20, as shown in FIGS. 1 and 2 support and transport the roller shafts 18. Suitable structural members 22 provide support for the inclined conveyor and include integral carton guide rails 24 and chain guide rails 26, the latter serving to define the angle of inclination of chain belt 20 and to provide tracking suport therefor. Each chain belt 20 is supported at its raised extremity by an idler sprocket 28 and is driven and supported at its lower end by a similar sprocket 30. As shown in FIG. 2 a pair of drive sprockets 30 may be supported and driven in any suitable manner such as, for example, by positioning them on a transverse drive shaft 32 which is journaled in cross members 34 and rotated by a conventional motor-driven belt and pulley arrangement, 36 and 38 respectively.

Referring now to FIGURES 3-6 inclusively, it will be seen that each of the rollers 14 and shafts 18 is provided with interacting devices which allow the load-bearing upper surfaces of the rollers to rotate freely in the upward direction of the conveyor (arrow A in FIGURE 3) but restrain downwardly-directed roller rotation (arrow B in FIGURE 4). In the preferred embodiment, the interacting rotation-controlling devices are enclosed within the rollers and include a ratchet member 40 and a pawl assembly 41 as shown in FIG. 5, the former generally being carried by the respective rollers 14 and the latter being appurtenant to the shafts 18.

Ratchet member 40 preferably comprises a tubular-like element unitarily and coaxially encased within roller 18 and being provided with a series of radially aligned, inwardly extending arcuate ledges or panels 44. The inner surface of the respective arcuate ledges define camming surfaces 46 and their respective edges define locking teeth 48. Preferably, three such ledges are provided, the respective ledges being in a circular array, and displaced by about 120 degrees. While the number of ledges may be modified, the most beneficial operation of the system will be accomplished by employing non-diametrically aligned ledges. This preferred relationship of the respective ledges will become more apparent subsequent to the description of the pawl assembly.

The pawl assembly includes a generally wing-shaped pawl 42 and a pawl supporting member 50, both of which are enclosed within roller 14 inwardly of bearing assembly 16. A locking collar 52 secured to shaft 18 is used to restrain the pawl assembly from slipping along the shaft. As shown in FIG. 6, pawl 42 includes opposed panels 54 and 56 respectively, which are linked by a downwardly convex, arcuate section 58. The longitudinal extremities of the respective panels are deformed to define invertedly-related cam-follower surfaces 60 and locking surfaces 62, i.e. panel 54 includes a downwardly and inwardly extending arcuate surface while panel 56 includes an upwardly and inwardly extending arcuate surface defining the respective inverted cam-follower surfaces 60. Pawl support member 50 includes spaced flanges 64 which are stationarily mounted to shaft 18, the flanges being joined by an annular section 66. For the purpose of supporting pawl 42, and to restrain any rotational movement thereof, annular section 66 is formed with opposed slots defining a lower set of supporting shoulders 68 and an upper set of shoulders 70, the latter engaging the upper surfaces of panels 54 and 56 to prevent rotation of pawl 42. It is important that the longitudinal dimension of pawl 42 exceed the diameter of annular section 66 thereby allowing the respective locking surfaces and cam-follower surfaces to project radially therefrom, and that pawl panels 54 and 56 be sufficiently long to allow limited longitudinal movement upon supporting shoulders 68.

In actual operation cartons 12 may be positioned upon rollers 14 and by means of the driven chain belt 20 are transported along the upper reach of the conveyor in a downward path. Since the tendency of the rollers, upon downward carton descent, will be to rotate in a counter-clockwise direction due to the carton load thereupon (FIGURE 4), the pawl and ratchet members are adapted to interact and restrain any such rotation. This is accomplished by the fact that upon initial counter-clockwise rotation locking teeth 48, which project inwardly of ratchet member 40, will engage the complementing locking surfaces 62 of pawl 42. Since the upper shoulders 70 of support member 50 prevent the pawl from rotating in a counterclockwise direction as shown in FIG. 4, further rotational motion of the roller is prevented. Thus, controlled carton descent is obtained by regulating the traversing speed of chain belt 20.

Suitable means for restraining cartons 12 at the base of the inclined conveyor path is also provided. As shown in FIGURE 1 a transversely disposed baffle 72 may be employed for this purpose. Thus, as the cartons are transported downwardly along conveyor 10, engagement with baffle 72 prevents further translation and the chain then drags successive rollers beneath the immobilized cartons. Here the ratchet and pawl members, 40 and 42 respectively, slippingly interact and allow upwardly directed roller rotation (FIGURE 3) which precludes carton scoring and provides article accumulating features, the interaction being characterized by a substantially planar, longitudinal oscillation of pawl 42. Referring to FIGURE 3 it will be seen that upon upwardly-directed roller rotation, pawl cam-follower surfaces 60 will ride upon ratchet camming surfaces 46 sequentially causing the pawl to be forced radially away from the respective camming surfaces. It is to facilitate this longitudinal oscillation of pawl 42 that, in the preferred embodiment, arcuate panels 44 are disposed in non-diametric relation.

From the foregoing, it should be readily apparent that cartons may be positioned upon the upper reach of the conveyor and, by regulating the speed of the motor-driven belt, they may be descended therealong in a selectively controlled manner. The possibility of run-away cartons is virtually eliminated because of counterclockwise rotational restraint exercised upon the respective rollers by the interlocking feature of the pawl and ratchet members. Thus, a tandem array of cartons, as shown in FIG. 1, may be moved from right to left until they are restrained by a suitable stop-member. Since the continual movement of the chain belt will cause the rollers to drag beneath, and in contact with, the lower surfaces of successively restrained cartons, these rollers should preferably be free to rotate in a clockwise direction if marring or scoring of the carton bottom surfaces is to be prevented. This feature is provided by the slipping interaction of the ratchet camming surfaces and the pawl cam-follower surfaces.

While the invention has been described with reference to the preferred embodiment, it will be appreciated that various modifications are possible. Accordingly, the foregoing is to be considered exemplary, rather than limiting and the true scope of this invention is as defined in the following claims.

I claim:

1. Inclined accumulating conveyor comprising: inclined chain means; a plurality of spaced members stationarily mounted to said chain means; rollers rotatably positioned on said spaced members; means for supporting and guiding said inclined chain means, the upper margins of said rollers thereby defining an inclined article supporting surface, and means for driving said chain means whereby articles may be conveyed along said inclined supporting surface; ratchet means carried by said rollers having arcuate ledges defining locking teeth and camming surfaces; pawl means, and means mounted to said spaced members for supporting said pawl means proximate said ratchet means and allowing limited longitudinal movement of said pawl means, the longitudinal extremities of said pawl means being formed with invertedly related cam-follower surfaces and locking surfaces, said cam-follower surfaces slippingly and sequentially engaging said caming surfaces in response to upwardly-directed rotation of said rollers, and said locking surfaces engaging said locking teeth upon downwardly-directed rotation of said rollers.

2. Inclined article accumulating conveyor comprising: inclined driving means; a plurality of spaced shafts mounted to said driving means; roller members rotatably positioned on said shafts, the upper margins of said roller members thereby defining an inclined article supporting surface; means for supporting said driving means; interacting ratchet means and longitudinally oscillatable pawl means positioned within said roller members for restraining rotation of said roller members in the downward direction of said inclined article supporting surface and for allowing upwardly directed rotation of said roller means.

3. Conveyor of claim 2, wherein said ratchet means includes at least one arcuate ledge having a locking tooth and a caming surface.

4. Conveyor of claim 3 wherein said longitudinally oscillatable pawl means includes a cam-follower surface and a locking surface, said locking surface being engageable with said ratchet locking tooth to restrain downwardly directed rotation of said roller members and said cam-follower surface being slippingly engageable with said ratchet caming surface in response to upwardly directed roller member rotation.

5. Conveyor of claim 4, wherein said ratchet means is carried by said roller members.

6. Conveyor of claim 5, wherein said ratchet means includes at least two arcuate ledges, said ledges being in non-diametric relation.

7. Conveyor of claim 6, wherein the longitudinal extremities of said pawl means each include a cam-follower surface and a locking surface.

8. Conveyor of claim 7 and further including means mounted to said shaft for supporting said pawl means and allowing limited longitudinal movement thereof.

9. Conveyor of claim 8, wherein said cam-follower surfaces constitute the leading faces of said pawl means upon upwardly directed rotation of said rollers.

10. Conveyor of claim 8, wherein said locking surfaces constitute the leading faces of said pawl means upon downwardly directed rotation of said rollers.

11. Conveyor of claim 8, wherein said means mounted to said shaft for supporting said pawl means includes integral means engageable with said pawl means for restraining rotation of said pawl means.

References Cited

UNITED STATES PATENTS

| Re. 3,200 | 11/1868 | Moore | 188—82.77 |
| 1,852,942 | 4/1932 | Streine | 198—183 |

EDWARD A. SROKA, Primary Examiner

U.S. Cl. X.R.

193—35